United States Patent

[11] 3,585,476

| [72] | Inventor | Walter L. Rutchik |
| | | Wauwatosa, Wis. |
| [21] | Appl. No. | 746,120 |
| [22] | Filed | July 19, 1968 |
| [45] | Patented | June 15, 1971 |
| [73] | Assignee | Cutler-Hammer, Inc. |
| | | Milwaukee, Wis. |
| | | Continuation-in-part of application Ser. No. |
| | | 709,593, Feb. 27, 1968, now abandoned. |

[54] TRIGGER SWITCH SPEED CONTROL UNIT WITH ELECTRICAL FEEDBACK
20 Claims, 13 Drawing Figs.

| [52] | U.S. Cl. | 318/331 |
| [51] | Int. Cl. | H02p 5/16 |
| [50] | Field of Search | 318/331, 345, 327, 328 |

[56] References Cited
UNITED STATES PATENTS

| 3,302,088 | 1/1967 | Wigington | 318/345 |
| 3,402,338 | 9/1968 | Thoresen | 318/345 |
| 3,447,657 | 5/1969 | Brown | 318/345 |
| 3,222,583 | 12/1965 | Gutzwiller | 318/331 |
| 3,329,842 | 7/1967 | Brown | 318/345 |

OTHER REFERENCES
SCR MANUAL, General Electric Co., Third ED., 1964, Pg. 132—133

*Primary Examiner*—Oris L. Rader
*Assistant Examiner*—Thomas Langer
*Attorney*—Hugh R. Rather ABSTRACT: A self-enclosed trigger switch speed control unit interchangeably usable in place of a conventional trigger switch in the handle of a portable drill. The unit incorporates therewithin a solid state power control circuit of feedback-type responsive to trigger movement to provide continuously variable adjustment of the speed of a universal motor from zero speed through a predetermined usable speed range and responsive to motor counter e.m.f. as feedback affording stable speed regulation under varying load.

NO LOAD
250 RPM

160 OZ. IN.
230 RPM

320 OZ. IN.
210 RPM

Inventor
Walter L. Rutchik
By Wm. A. Autio
Attorney

Inventor
Walter L. Rutchik
By *Wm. A. Autio*
Attorney 3,585,476

TRIGGER SWITCH SPEED CONTROL UNIT WITH ELECTRICAL FEEDBACK

CROSS-REFERENCE TO RELATED APPLICATION

This is a continuation in part of W. L. Rutchik copending application Ser. No. 709,593, filed Feb. 27, 1968, now abandoned.

BACKGROUND OF THE INVENTION

This invention relates to the portable tool and appliance control art and more particularly to power control units that are small enough to be mounted within the housing of any tool or appliance and controlled concurrently with the use of such tool or appliance. Such power control units are completely self-enclosed in insulating material to enable insertion thereof within the tool housing with the actuator extending out and connection of the connecting leads thereof to the tool motor and power supply.

Power control systems completely mounted within or on the tool housing have been known heretofore.

In one prior form, a solid state power control circuit having automatic feedback regulation from the load voltage has been mounted on a panel which forms the bottom plate of a portable drill housing and is controlled by a trigger switch and a thumb-operated rotary knob controlled variable resistor for speed control. However, this power control circuit has been specially adapted for a particular drill, is not self-enclosed, and is not available for general use.

In another prior form, the elements of a power control circuit have been enclosed within the insulating base of a trigger switch and the switch and variable resistor also have been built thereinto to provide a unitary self-enclosed speed control device for general use in portable drills and the like. However, in order to fit such power control circuit within the base of a conventional trigger switch, it was found necessary to restrict the components of such system to a minimum including elimination of the electrical feedback feature due to the large physical size of the large wattage components then thought to be necessary to handle the energy fed back from the motor. As a consequence of stripping the circuit down to its bare essentials this prior form was left with a severely drooping speed-torque characteristic such that insufficient power was available at the low speed end of the speed range to be able to perform certain jobs effectively such as driving screws and the like.

In still another form, a separate box has been used for mounting the power control circuit into which the electric cord of the tool was plugged and having a knob or the like on the box for adjusting the power.

However, none of these prior devices have the combination of features that are desirable in a device of this type. That is, they do not include the comparison of the electrical feedback voltage with the reference voltage to obtain the pedestal voltage for ramp and pedestal firing control; they do not include both the electrical feedback from the load for speed regulation and the unitary construction into the small base of the size of a conventional trigger switch; they do not have both such feedback and the universality of application to tools or appliances in general; and they do not have both such feedback and the self-enclosed unitary construction with trigger control concurrently with use of the tool.

SUMMARY OF THE INVENTION

This invention relates to a solid state system that is continuously adjustable through a predetermined range to control electric power to a load, which system, which is provided with automatically functioning electrical feedback control, is designed so as to have sufficiently small electrical energy dissipation to enable use of electrical components small enough in electrical rating and consequently in physical size to be able to fit all these circuit components easily within the base of a conventional size trigger switch and to provide improved performance.

An object of the invention is to provide an improved power control system for an electrical load.

A more specific object of the invention is to provide an improved power control system of the automatic feedback-type for an electrical load.

Another specific object of the invention is to provide an electrical feedback type power control system for a load device designed with low enough power dissipation in the control components to enable use of small enough components to fit the whole system within the base of a conventional trigger switch.

Another specific object of the invention is to provide an improved electrical feedback-type speed control system for an electric motor that provides stable speed control from zero speed up through a useful speed range including zero speed turn-on without chugging and is self-enclosed in a unit of minimum size.

Another specific object of the invention is to provide an improved speed-signal-feedback speed control system for a series motor wherein the ripple coupling is eliminated, hunting sensitivity is reduced, gain can be increased, and zero-speed turn-on is possible without chugging.

Other objects and advantages of the invention will hereinafter appear.

BRIEF DESCRIPTION OF THE DRAWINGS

These and other objects and advantages of the invention and the manner of obtaining them will best be understood by reference to the following description of preferred embodiments of a trigger switch speed control unit with electrical feedback taken in conjunction with the accompanying drawings, wherein.

DESCRIPTION OF THE PREFERRED EMBODIMENTS

Figure 1:
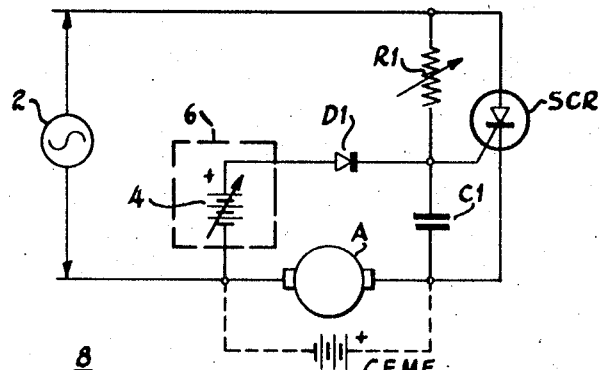
FIG. 1 is a schematic diagram of a control system according to the invention with the reference voltage means being depicted as an adjustable battery.

Referring to FIG. 1, there is shown a speed control system supplied from an alternative current source 2 for controlling a universal motor represented by armature A.

This system comprises a solid state gating-type power controlling element such as a unidirectional triode thyristor known as a semiconductor controlled rectifier or SCR. This SCR is connected through its primary current path at its main conduction electrodes such as the anode and cathode in series with motor armature A across the alternating current source such that the armature is between the cathode and the source. A "ramp" voltage control means that is shown as a variable gain control resistor R1 and a firing control capacitor C1 are connected in series in that order from the anode to the cathode of the SCR, the junction between the resistor and capacitor being connected to the gate of the SCR, the voltage developed on the capacitor being applied across the secondary, control current path of the SCR.

While a sensitive-gate semiconductor controlled rectifier such as one having a maximum gate trigger current of 200 microamperes or the like is preferable in portable tool use to reduce the size and rating of circuit components, the invention is not intended to be limited thereto since other types of SCR's are usable in the system combination.

A reference voltage control means shown as an adjustable-voltage battery 4 enclosed in broken line rectangle 6 is connected by a unidirectional diode D1 from the armature side of the AC source to the gate of the SCR. That is, the positive polarity side of the variable battery is connected through diode D1 in its forward, low impedance direction to the gate of the SCR and the negative polarity side of the battery is connected to the junction between the motor armature and the AC source.

The counter electromotive force CEMF of the motor is depicted as a battery symbol connected by broken lines across the motor armature with positive polarity toward the cathode of the SCR and negative polarity toward the AC source.

In operation, the system in FIG. 1 fires the SCR into conduction once on each positive half of each voltage cycle, assuming that the reference voltage at battery 4 and gain control resistor R1 are adjusted to raise the gate voltage to the firing value. On each such positive half-cycle, that is, when the upper side of source 2 is positive, a firing voltage is produced on capacitor C1 to fire the SCR.

The firing voltage pedestal" of two parts, a fixed but adjustable or "pedestal"voltage portion and an increasing or ramp voltage portion superimposed thereon. For the "-pedestal" voltage, battery 4 causes current to flow through diode D1 to charge capacitor C1 quickly to a predetermined fixed value depending upon the adjustment of battery 4. During the positive half-cycle of source voltage, current flows through resistor R1 to charge capacitor C1 whereby to provide the increasing or ramp voltage on top of the pedestal voltage derived from battery 4. Thus the gate to cathode voltage increases during the positive half-cycle until it reaches the firing value of the SCR. If the firing voltage of the SCR is not reached, then on the negative half-cycle the capacitor is discharged by an equal amount and a cycle to cycle build up of charge is prevented. Thus, the major cause of "loping" or "chugging" at low speeds is eliminated.

This ramp voltage has a cosine characteristic relative to the sine voltage wave applied to the anode of the SCR. That is, since the capacitor charging current flow through resistor R1 is dependent upon the magnitude of the sine voltage wave of source 2 during the positive half-cycle, it will be apparent that the ramp voltage will increase at a slow rate at the beginning of the half-cycle, will increase at its fastest rate at the middle of the half-cycle when the source voltage is maximum and will level off at its maximum value toward the end of the positive half-cycle of source voltage, Thus, the ramp voltage will be equivalent to a sine wave having a ninety degree phase lag relative to the sine wave of source voltage, that is, a cosine wave.

This cosine ramp voltage superimposed upon a constant but adjustable pedestal voltage provides a linear input to output characteristic while small changes in pedestal voltage produce large changes in the firing phase angle. Linearity is obtained since the cosine ramp voltage, when raised or lowered in equal increments by the pedestal voltage, produces small changes in phase angle at and near the center of the positive half-cycle of source voltage where amplitude is high and correspondingly larger changes in phase angle at the beginning and end portions of the positive half-cycle where amplitude is lower.

When the SCR is fired on each positive half-cycle, current flows from the AC source through the SCR and the motor armature to start the motor running. In this illustration, armature A is representative of the entire motor including its field winding, which may be a series motor such as a universal motor normally used in appliances and power tools. Alternatively, the series field winding may be connected in one of the power leads of the source.

As the motor rotates, a counterelectromotive force is produced as depicted by the battery CEMF. During the period between power pulses, that is, when the power controlling element is not conducting, the CEMF energy is derived from the residual magnetic field. This residual magnetic field remains relatively constant during this period; therefor, the CEMF is a direct function of the rotational speed. As will be apparent, this counter voltage or CEMF has a polarity in opposition to the polarity of the reference voltage. Consequently, the counter voltage is subtracted from the reference voltage so that the voltage remaining to charge capacitor C1 is the difference in these voltages. Therefore, the counter voltage is in the nature of a negative feedback voltage which is used to regulate the motor speed under conditions of varying load.

If the load driven by the motor should increase, causing the motor to slow down, the counter voltage, which is proportional in magnitude to motor speed, decreases so as to cause a corresponding increase in the voltage that charges capacitor C1. As a result of this, the capacitor charges to the firing value sooner whereby the firing angle has been advanced. This advance in firing angle applies more power to the motor since the SCR always conducts to the end of the positive half-cycle of source voltage. This added power speeds up the motor.

If the load driven by the motor should decrease, causing the motor to speed up, the counter voltage, being proportional to motor speed, increases so as to cause a corresponding decrease in the voltage that charges capacitor C1. Consequently, it now takes longer to charge the capacitor to the firing value whereby the firing angle has been retarded. This retardation in firing angle results in less power being applied to the motor to slow down the motor speed.

From the foregoing, it will be apparent that the motor has been connected in the feedback loop or control loop, that is, the closed circuit connected across the firing capacitor and including reference voltage device 4 and diode D1. In this feedback loop, the motor performs a regulating function by sending back a speed signal which is used to modify the reference voltage in a direction tending to maintain the motor speed constant even if the load varies. This regulation is automatic and the only manual adjustment needed is to set the desired speed point for the motor by setting the value of the reference voltage.

Figure 2:
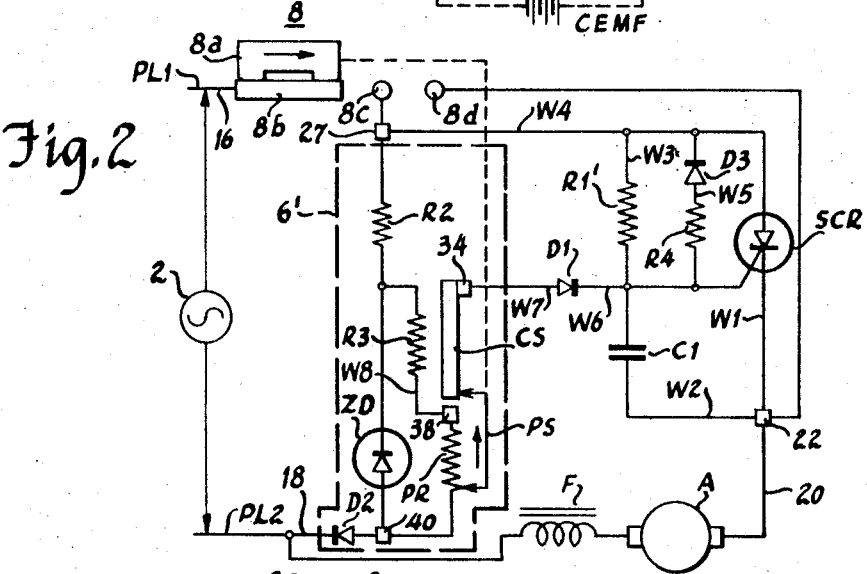
FIG. 2 is a schematic diagram of a control system according to the invention including a first embodiment of reference voltage circuit.

While FIG. 1 shows the reference voltage means generally as a battery having adjustable voltage, a more practical circuit is shown in FIG. 2, wherein like elements are given similar reference characters.

In the system of FIG. 2, the upper side of alternating current source 2 is connected through power line PL1 and a switch 8 to the anode of the SCR and the cathode of the latter is connected through the winding of armature A and the winding of field F and power line PL2 to the lower side of the source.

Switch 8 is provided with a slidable bridging contact 8a, an elongated stationary contact 8b and a pair of stationary contacts 8c and 8d equally spaced in succession from one end of contact 8b. When bridging contact 8a is moved in the direction indicated by the arrow thereon, it will first bridge contacts 8b and 8c and when it is moved farther, it will bridge contacts 8b and 8d. The upper side of AC source 2 is connected to stationary contact 8b and stationary contact 8c is connected to the anode of the SCR for on-off switching purposes whereas stationary contact 8d is connected to the cathode of the SCR for SCR shunting purposes.

A fixed resistor R1' of selected value that is the ramp voltage control means and capacitor C1 are connected in series in that order from the anode to the cathode of the SCR and the junction therebetween is connected to the gate of the SCR. The reference voltage means enclosed in broken line rectangle 6' is connected through diode D1 in its forward, low impedance direction to the junction between capacitor C1 and resistor R1'.

The reference voltage means within rectangle 6' in FIG. 2 has been substituted for variable battery 4 within rectangle 6 in FIG. 1 and is designed to be supplied from the same alternating current source 2 that supplies the load.

This reference voltage circuit comprises a voltage divider and means for applying a continuously adjustable reference voltage therefrom through diode D1 to charge capacitor C1. This voltage divider is connected across AC source 2. More specifically, this voltage divider comprises a number of elements connected in series from stationary contact 8c to the lower side of AC source 2. This series includes a fixed resistor R2 of relatively high resistance value, a fixed resistor R3, a potentiometer resistor PR and a unidirectional diode D2 in its forward, low impedance direction connected in that order from stationary contact 8c to the lower side of the power source. A bridging-type potentiometer slider PS has one end in sliding contact with potentiometer resistor PR and the other end in contact with a contact strip CS that is connected through diode D1 to the upper side of firing capacitor C1. The dotted line between bridging contact 8a and potentiometer slider PS indicates a mechanical connection hereinafter described with reference to FIGS. 7 and 8 whereby they move in unison in the direction of the arrows when an operating lever is depressed. A voltage clamping zener diode ZD is connected in its electron avalanche or "breakdown" direction from the junction between resistors R2 and R3 to the junction between potentiometer resistor PR and diode D2 so as to be connected across resistor R3 and potentiometer resistor PR.

The system of FIG. 2 also includes means for discharging capacitor C1 on each negative half-cycle of the source voltage, that is, during the time that the lower side of the AC source is positive and the upper side thereof is negative or when the capacitor voltage is higher than the source voltage. This means comprises a diode-resistor circuit having a resistor R4 and a diode D3 connected in series with one another between the gate and anode of the SCR, diode D3 being poled in its forward, low impedance direction from the gate to the anode of the SCR. This means provides a unidirectional discharge path in shunt of resistor R1' of lower impedance than the latter for discharging capacitor C1 into the AC source on negative half-cycles of the source voltage.

While field winding F has been shown in FIG. 2 as being connected in series with the winding of armature A in the feedback loop, it will be apparent that the field winding could alternatively be connected outside the feedback loop, for example, in power line PL2 between the lower side of AC source 2 and the junction of diode D2 therewith.

The operation of the system of FIG. 2 will now be described.

To connect power to the motor to start it operating, bridging contact 8a is moved in the direction of the arrow to connect stationary contacts 8b and 8c. This completes a circuit from the upper side of AC source 2 to the anode of the SCR whereas the cathode of the latter is connected through the windings of armature A and field F to the lower side of AC source 2.

These switch contacts 8a, 8b and 8c also complete a circuit from the upper side of the AC source through fixed resistors R2 and R3, potentiometer resistor PR and diode D2 to the lower side of the AC source to cause current flow therethrough on each positive half-cycle of the source voltage when the same positive half-cycle of source voltage is also being applied to the anode of the SCR.

Zener diode ZD clamps the voltage across resistors R3 and PR to a fixed level. Assuming that the voltage across these two resistors due to the aforesaid current flow therethrough would be higher than the breakdown voltage of the Zener diode, the Zener diode breaks down and clamps the voltage at the junction of resistors R2 and R3 to a fixed value equal to such breakdown voltage. Therefore, although the source voltage is varying as a sinusoidal function, the voltage which appears on the potentiometer resistor has a rapid rise to a constant voltage in the early period of the positive half-cycle to afford selectively adjustable, stable charging of the firing capacitor. If the voltage at the junction of resistors R2 and R3 should tend to increase, an increasing avalanche of current flows through the Zener diode to keep the voltage thereat constant.

Potentiometer slider PS moves upwardly according to its arrow in unison with bridging contact 8a as the latter slides on contacts 8b and 8c. As a result, an increasing portion of resistor PR is inserted in the feedback loop circuit. The increasing voltage tapped from resistor PR causes a current to flow through the contact strip CS, diode D1, capacitor C1 and motor armature and field windings A and F to cause charging of the capacitor. This current flow charges capacitor C1 quickly on each positive half-cycle of the source voltage to a fixed value. This fixed value may be adjusted up or down by movement of slider PS up or down, respectively. At the end of each positive half-cycle when the applied voltage decreases to zero and reverses in polarity to a negative half-cycle, capacitor C1 discharges through resistor R4 and diode D3 into the power source. Some discharge current may also flow through resistor R1' although resistor R4 is much lower in value so that the significant discharge current flows therethrough. Consequently, the capacitor voltage due to current flow from the reference voltage circuit considered alone forms a "pedestal" having a sharply rising front, a flat top and a sharply falling trailing end.

A cosine ramp voltage is applied on top of the pedestal voltage to afford a large change in firing angle in response to a small change in pedestal height and to provide linearity between input and output controls. This ramp voltage is provided by current flow through resistor R1' to charge capacitor C1. Diode D1 blocks any current from flowing through resistor R1' back into the reference voltage circuit so that capacitor C1 can charge to a higher voltage than the pedestal in accordance with the cosine ramp. The gain, that is, the slope of the ramp voltage, may be selected by selecting the value of resistor R1', increasing R1' to increase gain and vice versa.

When the ramp voltage on capacitor C1 reaches the firing value, capacitor C1 discharges into the gate of the SCR to fire the SCR into conduction. As a result, current now flows from the AC source through contacts 8a, 8b and 8c of switch 8, the anode and cathode of the SCR and the armature and field of the motor to start the motor running. This current flows from the firing point for the remainder of each positive half-cycle to pass pulses of current to the motor. On each alternate negative half-cycle, diode-resistor circuit D-R4 discharges capacitor C1 to allow it to start charging from the same voltage level on each positive half-cycle to afford stability of operation by insuring that a pulse will be applied to the motor on each cycle of the source voltage.

The negative half-cycles of voltage do not supply power to the motor. Diode D2 blocks current from flowing in the reference voltage circuit to keep power dissipation therein at a minimum and the SCR does not conduct in the reverse direction and therefore blocks current from flowing in the motor circuit during the periods when the polarity of the source voltage is reversed.

The system in FIG. 2 affords speed adjustment in a stepless or continuous manner from zero speed to the speed at which the motor runs at full half-wave firing of the SCR. While the speed at which the motor runs at full half-wave firing of the SCR depends on the particular motor, gearing, load, etc., for a portable electric drill, this speed at no load is substantially above one-half of full speed.

To obtain full speed, bridging contact 8a is moved further so as to connect stationary contacts 8b and 8d. As will be apparent from FIG. 2, the reference voltage circuit and the SCR circuit have now been disconnected and the motor has been connected directly across the AC source. In other words, this switching action shunts the speed control circuit. Full-wave AC voltage is now applied to the motor to run it at top speed.

On each negative half-cycle, diode D2 blocks current from flowing from line PL2 upwardly through the reference voltage circuit and diode D1 and the SCR gate-cathode circuit in shunt of the motor when contact 8a engages contact 8d.

The system shown in FIG. 2 can readily be modified from the half-wave speed control system that is shown to a full-wave speed control system, that is, a system wherein the SCR is fired on each half-cycle rather than only on each positive half-cycle. This is done by connecting a full-wave rectifier bridge between the AC source and the two input power lines PL1 and PL2. With this addition, full-wave rectified voltage of positive polarity is applied to the system. Diode D2 can be omitted in such modification.

Exemplary values for the circuit components of FIG. 2 may be as follows:

SCR: D1, D3—Electronic Control Corp. special semiconductor assembly
D2—1N4005
R'1—1 megohm, ⅒ watt
R2—10 kilohm, ½ watt
R3—2 kilohm, ¼ watt
R4—100 kilohm, ⅒ watt
PR—500 ohm, ⅛ watt
ZD—17 volt
C1—1.6 microfarad, 6 v. D.C.
A.C. source—115 volts A.C.

An example of a sensitive-gate SCR is one having a 200 microampere maximum trigger current requirement as compared to 15 milliamperes in the ordinary SCR of similar power rating.

Figure 3:
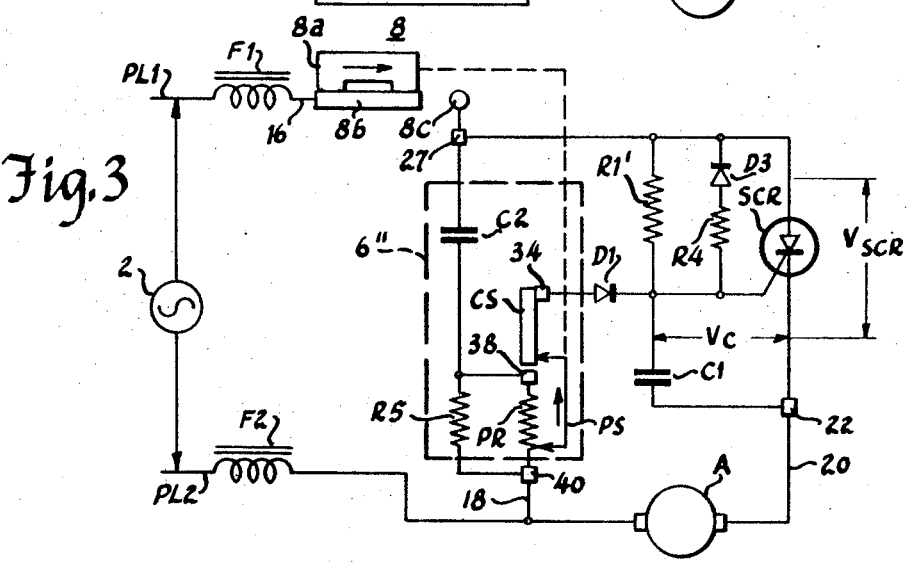
FIG. 3 is a schematic diagram of a control system according to the invention including a second embodiment of reference voltage circuit.

While the system in FIG. 2 is suitable in all respects for the purposes intended as hereinbefore described, FIG. 3 shows a system having still further improvements. This system is illustrated in conjunction with a split field motor showing how the two field windings F1 and F2 could be connected. Use with a single field, series motor can be visualized if winding F1 is considered to be omitted from FIG. 3. Reference characters similar to those in FIG. 2 are used in FIG. 3 for like elements.

Referring to FIG. 3, the power control systems shown therein comprises a connection from the upper side of AC source 2 through power line PL1, motor field winding F1 to elongated stationary contact 8b of switch 8. On-off stationary contact 8c is connected to the anode of the SCR whereas the cathode thereof is connected through the windings of armature A and field F2 and power line PL2 to the lower side of the AC source. Shunting stationary contact such as 8d of FIG. 2 is not used herein because the reference voltage circuit 6'' is an AC circuit and cannot be decoupled on the negative half-cycle such as the DC reference voltage circuit 6' being decoupled by diode D2. This SCR is preferably a sensitive-gate type when intended for use in small portable tools, meaning that the gate-cathode junction thereof has effectively a high impedance and operates on low current and, therefore, is highly sensitive to current.

A resistor R1' and a capacitor C1 are connected in series in that order from the anode of the SCR to the cathode and the junction therebetween is connected to the gate. Resistor R1' is the equivalent of resistor R1 in FIG. 1 but is shown as a fixed resistor rather than a variable one to indicate that for a particular application, including taking into consideration the motor characteristics, the gain desired may be determined and then a fixed resistor R1' of the proper value may be connected in to provide that gain.

A diode-resistor discharge path comprising resistor R4 and diode D3 in series connection from the gate to the anode of the SCR and across resistor R1' is provided as in FIG. 2 and for similar purposes.

Diode D1 connects a reference voltage circuit enclosed in broken lines 6'' to the gate of the SCR and to the upper side of firing capacitor C1 and blocks any current flow in the opposite direction, that is, toward the reference voltage circuit to isolate it from the ramp voltage means.

The modified reference voltage circuit in FIG. 3 comprises a voltage divider made up of a high impedance, very low power dissipation element such as a capacitor C2 of small value, an adjustable element such as a potentiometer having a resistor PR and a slider PS and a contact strip CS, and a trimming resistor R5 of fixed value. A circuit connection extends from stationary contact 8c through capacitor C2 and potentiometer resistor PR to the junction between armature A and field F2. Trimming resistor R5 is connected across potentiometer resistor PR. This trimming resistor has as its purpose to bring the divider voltage to the required value and may be used to compensate for mechanical or electrical tolerances or variations that might occur in quantity production. If desired, each unit may be tested for proper operation and a trimming resistor R5 of predetermined value connected in to bring the performance within required limits. The dotted line between movable bridging contact 8a and potentiometer slider PS represents a mechanical connection through an actuator such as a trigger hereinafter described in connection with FIGS. 7 and 8 whereby both the movable contact and slider are moved together in the directions of the arrows to operate the speed control unit while the tool that it controls is in use. Identifying Data for the circuit components of FIG. 3 may be as follows:

SCR: D1, D3—Electronic Control Corp., special semiconductor assembly
R'1—560 kilohm, ¼ watt
R4—300 kilohm, ¼ watt
R5—1.8 kilohm, ¼ watt
PR—1 kilohm, ⅛ watt
C1—4.7 microfard, 6 v. D.C.
C2—0.068 microfarad, 200 volt
A.C. source—115 volts A.C.

The operation of the system in FIG. 3 will now be described.

Motor operation is started by moving contact 8a to bridge contacts 8b and 8c and at the same time moving slider PS enough to start firing the SCR while bridging contact 8a slides on contacts 8b and 8c. As a result of closure of the switch contacts, the positive half-cycles of the source voltage are applied to the anode of the SCR.

The closure of the switch and movement of the potentiometer slider also cause firing pulses to be produced and applied to the gate of the SCR to fire the SCR into conduction. To this end, on each positive half-cycle of the source voltage, current flows through power line PL1, field winding F1, contacts 8b, 8a and 8c of the switch, capacitor C2, resistors PR and R5 in parallel, field winding F2 and power line PL2. The voltage appearing across the lower portion of potentiometer resistor PR causes a current to flow through contact strip CS and diode D1 to charge capacitor C1 quickly to the pedestal voltage.

Capacitor C1 charges quickly to the pedestal voltage at the beginning of each positive half-cycle of source voltage. For this purpose, it will be apparent that during the preceding negative half-cycle of source voltage, capacitor C1 will be discharging through resistor R4 and diode D3 into the AC source. When the source voltage alternates to positive, capacitor C1 will charge abruptly due to a leading voltage in the reference voltage circuit, the current therein will lead the positive half-cycle of source voltage by nearly ninety degrees. Since this leading current develops the reference voltage on the lower portion of the potentiometer resistor, this reference voltage will also lead the source voltage and thereby will have reached its peak value by the time that that the positive half-cycle of source voltage starts. As a result, this peak reference voltage assures quick charging of capacitor C1 to the desired level of pedestal voltage very early in the positive half-cycle of source voltage.

The ramp voltage on capacitor C1 is provided by current flow from the AC source through power line PL1, field F1, switch 8 and resistor R1'. Since the source sine wave positive half-cycle of voltage causes this ramp voltage charging, this ramp voltage will have a cosine modified characteristic for input-output linearity as hereinbefore described.

When the potentiometer slider is moved high enough, the SCR fires on each positive half-cycle to pass pulses of current to the motor.

The counter voltage of the motor which is proportional to motor speed has a polarity opposite to the polarity of voltage on the lower portion of potentiometer resistor PR and is subtracted therefrom as negative feedback to regulate the motor speed under varying load conditions. Since the peak pedestal voltage is produced on capacitor C1 early in the positive half-cycle due to the leading reference voltage, there will be a stable period of feedback voltage versus reference voltage comparison to improve the regulating effect. This is brought about by use of capacitor C2 in the reference voltage circuit.

Capacitor C2 also reduces power dissipation over a resistor or the like in this part of the voltage divider since it is primarily a reactive impedance that does not dissipate any significant power. As will be apparent by comparison with FIG. 2, this capacitor replaces several components such as Zener diode ZD, resistor R2 and diode D2. Trimmer resistor R5 is a refinement which is added for uniformity of production. While this version does not use a shunt circuit across the SCR, full speed can nevertheless be obtained thereby in applications where the motor is designed to run at full speed on a half-wave.

As shown in FIG. 3, armature A alone is preferably connected in the feedback loop and the field windings are connected in the power lines. When using a motor having a single series field winding, it is preferably connected where field winding F2 is shown in FIG. 3 to avoid having to disconnect the field from the armature.

In FIG. 3, the voltage across the SCR has been indicated as $V_{SCR}$ and the voltage across firing capacitor C1 has been indicated as $V_C$.

Figure 5A:
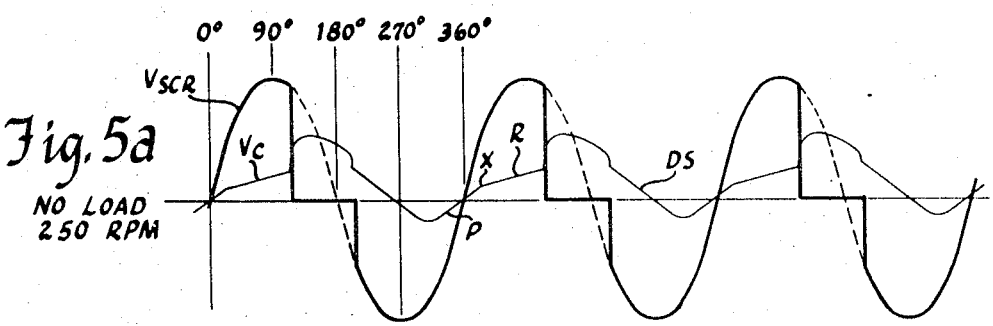
FIGS. 5a—c show voltage waves of the voltages across the power control element and the firing control capacitor for three operating conditions of the motor.
Figure 5B:
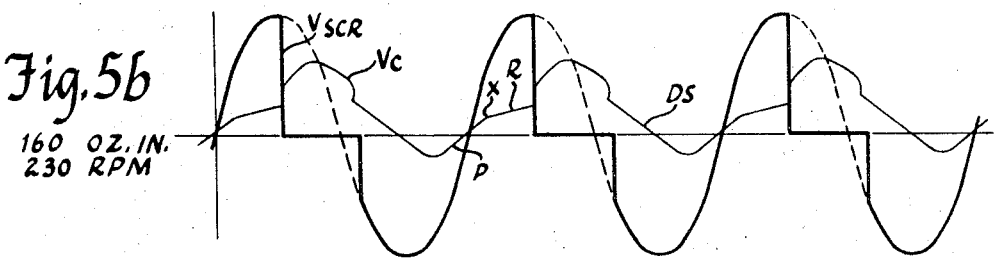
Figure 5C:
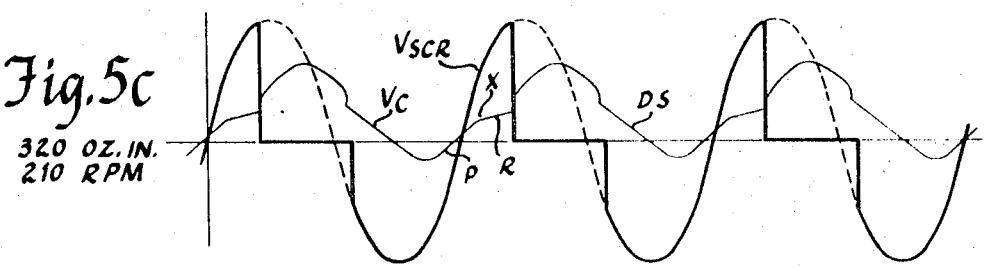

The characteristics of these voltages under operating conditions when load is applied to the motor and the feedback control automatically functions to attempt to maintain the speed constant are shown in FIGS. 5a, b and c. FIG. 5a shows the nature of these voltages at no load and the motor running at 250 r.p.m. as indicated thereat. FIG. 5b shows the nature of these voltages when a rated load of 160 ounce-inches is applied to the motor and the feedback control functions to maintain the motor speed at 230 r.p.m. FIG. 5c shows the nature of these voltages when a much greater load of 320 ounce-inches is applied to the motor and the feedback control functions to maintain the motor speed at 210 r.p.m.

Referring to curve $V_C$ in FIG. 5a, it will be seen that slope P which occurs near the beginning of each positive half-cycle of SCR anode voltage is the leading edge of the pedestal voltage to which capacitor C1 is charged by the resultant voltage which is the difference between the reference voltage and the feedback voltage. The knee of this pedestal is shown at X and is the peak voltage of the pedestal. The ramp voltage is shown as slope R and is superimposed on the flat-topped pedestal voltage.

The slope of this ramp voltage R stays constant once it is set by the value of resistor R1' in FIG. 3 and is indicative of the gain of the system. Referring to FIGS. 5b and 5c, it will be seen that the slope of ramp voltage R stays constant while the magnitude of the pedestal voltage increases. If a smaller resistor is substituted for resistor R1', more current will flow to charge the capacitor faster. This would be indicated by a greater slope on ramp voltage R. If a larger resistor is substituted therefor, less current will flow to charge the capacitor slower and would be shown by a ramp R of smaller slope. These substitutions would respectively decrease and increase the gain.

When the ramp voltage reaches the firing or triggering value of the gate of the SCR, capacitor C1 discharges current into the gate to trigger the SCR into conduction. This conduction drops the SCR anode-cathode impedance to near zero so that the voltage across the SCR drops to zero or very near to it as shown by voltage $V_{SCR}$ in FIG. 5a. Voltage $V_{SCR}$ then remains at zero until the SCR turns off at the end of the positive half-cycle. Actually, the SCR conducts until the current therein decreases to zero or near enough to zero to turn it off. In FIG. 5a, the SCR continues to conduct beyond the end of the positive half-cycle and does not turn off until shortly after the beginning of the following negative half-cycle. This is due to the inductive nature of the circuit in view of the motor windings whereby the current lags the voltage and continues to flow beyond the end of the positive half-cycle.

After the SCR is fired, the voltage on capacitor C1 varies up and down since the heavy current through the anode-cathode circuit increases the gate-cathode voltage drop on the SCR. Following the start of the negative half-cycle the voltage $V_C$ on capacitor C1 decreases as the capacitor discharges through resistor R4 and diode D3 as shown by downward scope DS in FIG. 5a. Due to this diode-resistor discharge circuit, the capacitor always discharges to the same voltage level on each cycle so that charging the next time always starts from the same voltage level. This insures that there is no excess charge remaining on the capacitor from the previous cycle and that the capacitor always charges thru the diode D1 to the proper pedestal voltage, thus preventing "loping" or "chugging" at low no load speeds due to cycle to cycle charge build up.

When load is applied to the motor, the motor will tend to slow down. This decreases its counter voltage whereby less is subtracted from the reference voltage resulting in a higher pedestal voltage as shown by point X in FIGS. 5b and 5c. The upward slope approaching point X, that is, the leading edge of the pedestal voltage, is also steeper since the capacitor charges faster at the higher resultant voltage. With the ramp slope remaining the same, such increase in the pedestal advances the firing angle, that is, moves it to the left in FIGS. 5b and 5c. Since the SCR conducts for the remainder of the positive half-cycle, more power is now applied to the motor tending to maintain its speed near the former value. This is indicated in FIG. 5b by a drop in speed from 250 r.p.m. only to 230 r.p.m. when 160 ounce-inches of load is applied. And in FIG. 5c the speed drops only to 210 r.p.m. when 320 ounce-inches of load is applied.

Figure 4:
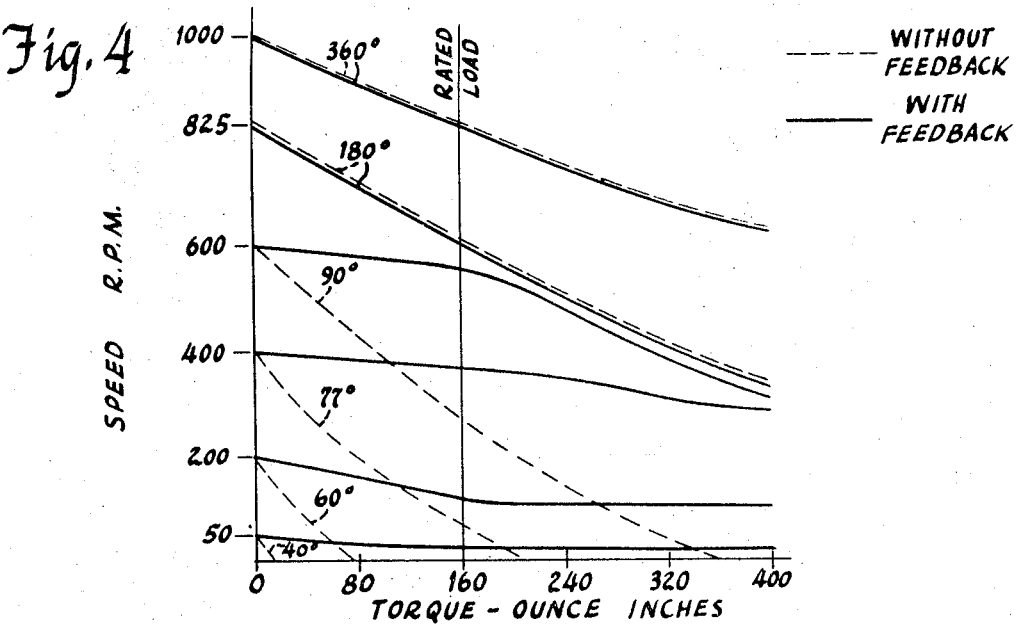
FIG. 4 is a graph showing in curve form operating characteristics of the invention in comparison to a prior art device.

To see what improvement in speed regulation the feedback system of the invention provides over nonfeedback systems, reference may be had to the curves in FIG. 4 wherein speed in r.p.m. is plotted along the ordinate against torque in ounce-inches along the abscissa. As indicated by the legend, the dashed line curves show how fast the speed decreases from a plurality of different no-load speed settings when load is applied on a phase control system having no speed signal feedback regulation. On the other hand, the solid line curves show the leveling off improvement in maintaining the speed on the system of the invention herein having speed signal feedback regulation.

The degree markings 90°, 77°, 60° and 40° in FIG. 4 indicate the conduction angles at which both the phase control nonfeedback system and the phase control, feedback system of FIG. 3 were set before load was applied to the motor by a dynamometer. In looking at these curves it should be kept in mind that the phase control nonfeedback system remains at the conduction angle at which it is initially set whereas the feedback system of the invention automatically increases the conduction angle as load is applied. Thus, the conduction angles shown in FIG. 4 are valid for the dashed line curves throughout their lengths and are valid for all the solid line curves except the upper two only at the starting point or zero torque point on vertical axis. These angles are valid for the upper two solid line curves throughout their lengths because no feedback regulation is available which could change the conduction angle. By conduction angle is meant the portion of each cycle during which current flows through the SCR to the motor.

Referring to the upper pair of broken line and solid line curves in FIG. 4, it will be seen full speed operation is shown thereby. The conduction angle is 360°, meaning that the shunting switch is closed 825 r.p.m. full-wave AC to the motor through contacts 8a, 8b and 8d of FIG. 2. Thus, the two systems operate in the same manner since no feedback regulation occurs. As load is applied, the speed decreases from 1,000 r.p.m. in the same way in both systems in accordance with the curves which are superimposed one on the other.

The second pair of curves are also superimposed one on the other and show that at a 180° conduction angle, that is, conduction for the full positive half-cycle and blocking during the negative half-cycle, the speed decreases from 825 r.p.m. in the same way in both systems in accordance with the curves as load is applied. The conduction angle remains constant in both systems since no feedback regulation takes place.

Referring now to the third pair of curves from the top, the difference in the two systems is clearly apparent. Starting at a no-load speed setting of 600 r.p.m. at a 90° conduction angle the motor speed of the nonfeedback system decreases rapidly with increase in load as shown by the steep downward slope of the dashed line since the conduction angle remains constant. On the other hand, the system of the invention shown in FIG. 3 maintains the speed nearly constant as it decreases only a small amount up to rated load as shown by the solid line leaving 600 r.p.m. Beyond rated load, the speed decreases at a faster rate as this curve nears the 180° conduction angle curve since speed feedback regulation is limited.

As shown by the remaining three pairs of curves in FIG. 4, the nonfeedback system was tested from no-load speeds of 400, 200 and 50 r.p.m. at conduction angles of 77, 60 and 40°, respectively, and in each instance the speed drops rapidly with increase in load as shown by the dashed line curves. In the latter two instances, the motor actually stalls before rated load is applied as shown by the intersection of the dashed line curves with the abscissa. On the other hand, the automatic speed regulation system of the invention maintains the speed almost constant with only a small decrease from 400 r.p.m. to rated load and beyond as shown by the solid line curve. The speed-torque curve starting at the 200 r.p.m. point on the ordinate appears to be modified by a motor characteristic which causes it to drop faster than the other solid line curves to a point just beyond rated load but beyond rated load the speed is maintained substantially constant. The 50 r.p.m. speed point solid line curve also shows very good speed regulation to rated load and much beyond.

As will be apparent from the curves in FIG. 4, the system of the invention, while exhibiting very low power dissipation in the control components enabling use of very low power rating components of small physical size, nevertheless functions in a superior manner as to speed regulation.

With the field winding removed from the feedback loop as shown in FIG. 3, the ripple coupling is eliminated, hunting sensitivity is reduced, gain can be increased, and zero speed turn-on is possible without chugging. Ripple coupling is the transformer action between the armature and field windings in those systems having both the armature and field windings connected in the feedback loop that causes stepped speed change because of phase change in ripple due to speed change of the motor. Hunting sensitivity may be characterized as a wide variation in the starting point. The advantage of being able to increase the gain is that at higher gain there will be less speed droop at high loads. Zero speed turn-on without chugging, of course, affords smooth starts.

The problem of transient capacitor discharge due to a high transient armature voltage at turnoff is eliminated by the diode in the feedback loop. Therefore, the control operates smoothly at all speeds.

The diode-resistor discharge path that is required if the field is in the feedback loop is rendered substantially optional when the field is removed from the feedback loop as in FIG. 3. If it is left out, the small armature inductance causes negligible charge on the capacitor at turnoff, as opposed to field discharge into the loop. However, if it is left out, feedback is reduced slightly and gain is limited in that it cannot be adjusted quite as high. Therefore, this diode-capacitor discharge path is preferably included.

Figure 6:
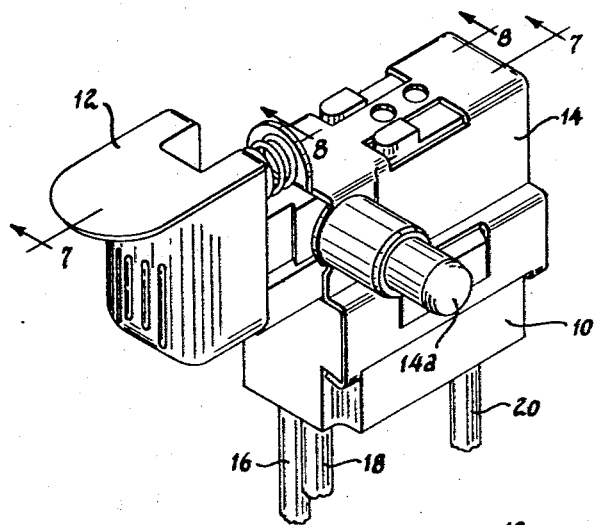
FIG. 6 is an isometric view of a trigger switch speed control unit incorporating the invention.

Referring now to the remaining FIGS. 6—11 of the drawings, a practical embodiment of the invention will be described wherein the speed control system of FIG. 2 is completely housed in a trigger switch unit. As shown in FIG. 6, this trigger switch speed control feedback unit has an external size and shape the same as the conventional trigger on-off switch unit and trigger nonfeedback speed control switch unit presently in commercial use so as to be interchangeable therewith. The only apparent difference is that it has three leads coming from the base rather than two since it must be connected in a feedback relation to the portable tool motor.

Figure 7:
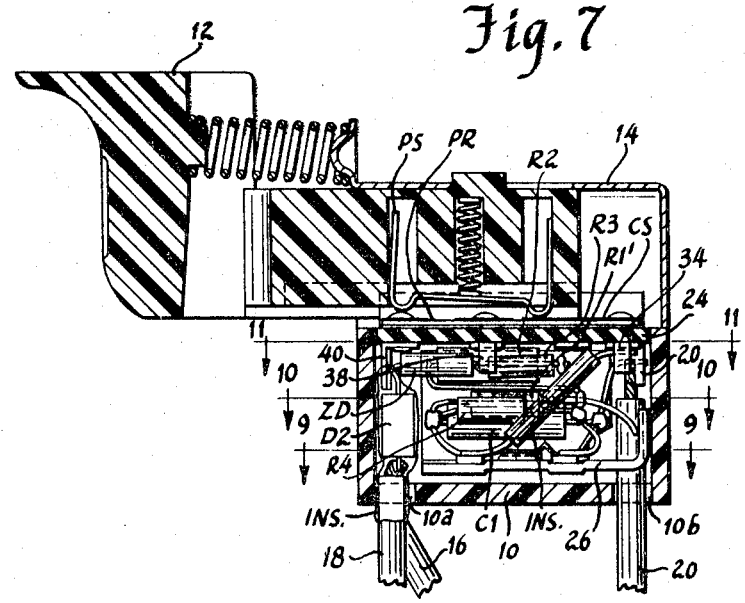
FIG. 7 is a cross-sectional view taken along line 7-7 of FIG 6 showing the potentiometer structure along with other internal parts.
Figure 8:
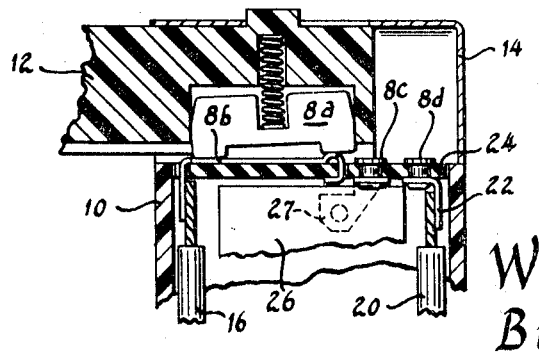
FIG. 8 is a fragmentary cross-sectional view taken along line 8-8 of FIG 6 showing the switch structure.

As shown in FIGS. 6, 7 and 8, the trigger switch speed control feedback unit is provided with an insulating base 10, a linearly movable trigger 12 of insulating material and a metal frame 14 for clamping the trigger on top of the base and for supporting a trigger lock button 14a.

As shown in FIGS. 7 and 8, base 10 has the shape of a rectangular box open at the top and having two openings 10a and 10b in the bottom, one adjacent each end wall, from which insulated conductors 16, 18 and 20 emerge. As will be apparent from comparing FIGS. 2, 3 and 7, conductors 16, 18 and 20 are adapted to connect the speed control system to the motor and to the AC source. For this purpose, conductor 16 is connected to field F1 if the motor has a split field or is connected to power line PL1 if the motor has only one field F2 or if field F1 is connected next to field F2. Conductor 18 is connected to a tap between the armature and field, this field being F in FIG. 2 and F2 in a split field motor as shown in FIG. 3, and the other terminal of the field is connected to power line PL2. Conductor 20 is connected to a terminal 22 of the speed control circuit, which terminal is connected by bare wires W1 and W2 within the base to the cathode of the SCR and to capacitor C1 and is connected by a rivet through mounting board 24 to shunting contact 8d of the switch. The rivet connection is shown in FIG. 8 and the two bare wire connections are best shown in FIGS. 2, 7, 9 and 10. The base, trigger and frame are similar to that disclosed in H. W. Brown U.S. Pat. No. 3,329,842, and reference may be had thereto for a detailed description and illustration of these parts. The spring-biased bridging contact 8a of switch 8 and the spring-biased bridging slider PS of the potentiometer are also similar to the bridging contact of the switch and the bridging contact of the variable resistor in the aforementioned Brown patent.

Figure 9:
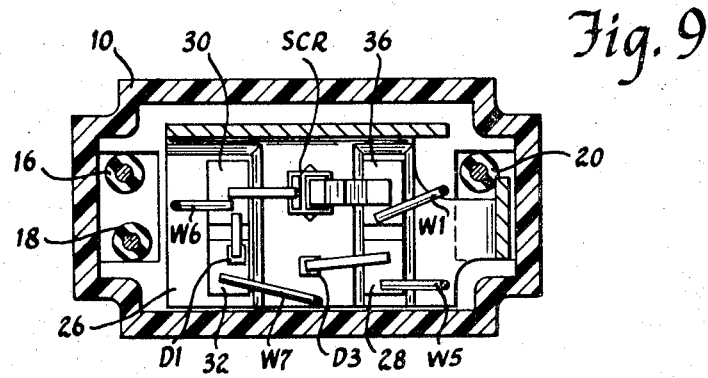
FIG. 9 is a cross-sectional view taken along line 9-9 of FIG. 7 showing a top view of the heat sink and solid state components mounted thereon.
Figure 10:
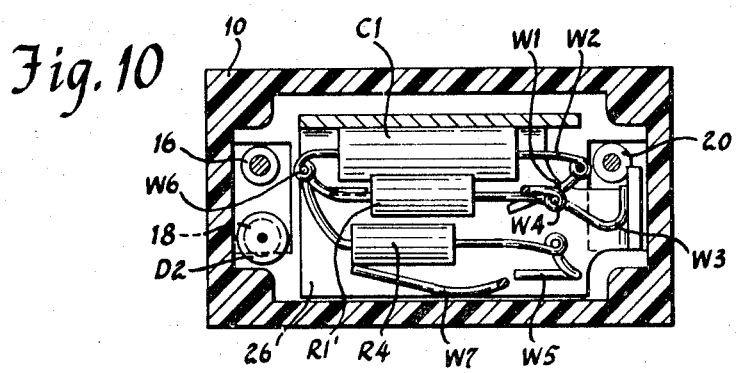
FIG. 10 is a cross-sectional view taken along line 10-10 of FIG. 7 showing a top view of circuit components including two resistors and a capacitor within the base.
Figure 11:
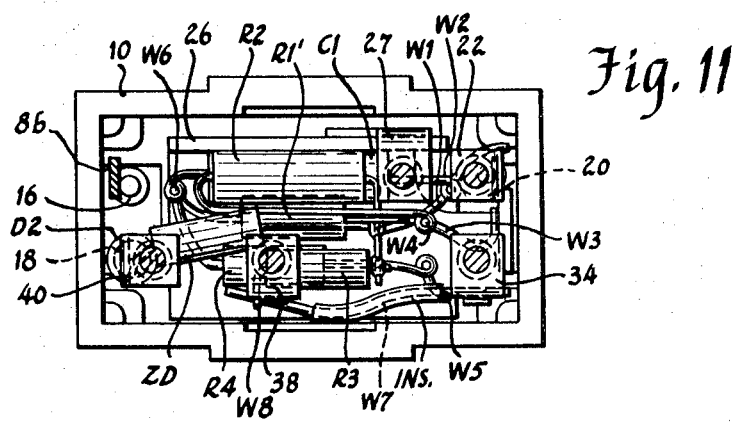
FIG. 11 is a cross-sectional view taken along line 11-11 of FIG. 7 showing a top view of the circuit components including two resistors and zener diode and connector terminals as they would appear if the mounting board were removed.

Referring to FIG. 9, the anode of the SCR and the cathode of diode D3 are soldered to a heat sink 26 which forms a common electrical connection therefor and for one end of resistor R1' through bare wire W3, FIG. 10, and one side of resistor R2 through bare wire W4, FIG. 11. Also, this heat sink is welded to a terminal 27 which is riveted through the mounting board to contact 8c of the switch as shown in FIG. 8. The anode of diode D3 is connected by a conductor strip to a small section of printed circuit board 28 mounted insulatingly on the heat sink which is connected by a bare wire W5 to one side of resistor R4 as shown in FIGS. 9 and 10.

As shown in FIG. 9, another small section of circuit board 30 is mounted insulatingly on the heat sink. The gate of the SCR is connected by a conductor strip to this circuit board 30 which in turn is connected by a bare wire W6 to the three wires of resistors R1', R4 and capacitor C1 as shown in FIG. 10. This circuit board 30 is further connected by a conductor strip to the cathode of diode D1 that is soldered to a third small section of circuit board 32 insulatingly mounted on the heat sink. The anode of diode D1 is electrically connected to circuit board 32 and the latter is connected by a bare wire W7, having an insulating sleeve INS as shown in FIG. 7, to a terminal 34. This terminal is riveted through the insulating mounting board 24 to contact strip CS. A fourth small section of circuit board 36 is insulatingly mounted on the heat sink to form a connection point for the aforementioned bare wire W1 and is in turn connected by a conductor strip to the cathode of the SCR as shown in FIG. 9.

As shown in FIG. 11, the other side of resistor R2 is connected to one side of Zener diode ZD and resistor R3 and the other side of resistor R3 is connected by a bare wire W8 to a terminal 38. This terminal is riveted through the mounting board to one end of potentiometer resistor PR having its other end riveted through the mounting board to a terminal 40. As shown in FIGS. 7 and 11, Zener diode ZD is connected at its other side to terminal 40 and diode D2 is connected between terminal 40 and conductor 18 with an insulating sleeve thereover for strain relief.

As shown in FIG. 11, there are five terminals riveted to the bottom surface of the mounting board for making connections from the circuit components therebelow to the switch and potentiometer thereabove. These terminals have been illustrated as small squares in the system diagram of FIG. 2 to facilitate identification thereof.

It will be apparent from FIGS. 7 and 9 through 11 that the circuit components of the system of the invention, which have been drawn to scale with respect to the base, trigger and frame, easily fit within the base with minimum insulation of their bare leads being required. This is brought about by the system design and the combination of parts used together therein that reduces power dissipation to a minimum thereby allowing use of components of very small electrical rating and consequently of small physical size.

While the apparatus hereinbefore described is effectively adapted to fulfill the objects stated, it is to be understood that the invention is not intended to be confined to the particular preferred embodiments of trigger switch speed control unit with electrical feedback disclosed, inasmuch as it is susceptible of various modifications without departing from the scope of the appended claims.

I claim:

1. A power control and feedback regulating system providing continuous control of electrical power supplied from an alternating current source to a load device starting from zero power and continuing over a substantial range of power values comprising:
   a control semiconductor means having a primary current path and a secondary, control current path having a portion common with said primary current path at one side thereof;
   means for connecting said primary current path in circuit with the load device across the source with at least the responsive portion of the load device being connected to said common portion;
   a variable time delay means energized from the source for providing a firing signal to the control current path for rendering said semiconductor means conducting in its primary current path at controlled times when half-cycles of positive source voltage are being applied to the primary current path comprising:
   a firing control capacitor connected across said control current path;
   adjustable reference voltage means for controlling the conduction angle of said semiconductor means;
   means comprising a unidirectional conducting element coupling said adjustable reference voltage means to the common junction of said firing control capacitor and said control current path;
   a feedback loop circuit including said adjustable reference voltage means, said unidirectional conducting element, said firing control capacitor and a responsive portion of the load device wherein the latter provides a voltage proportional to the load device operation and is poled with respect to said reference voltage to afford, in a compensating manner, a resultant voltage for charging said firing control capacitor to a pedestal voltage level early on each positive half-cycle of the source voltage;
   and ramp voltage control means connected between the other side of said primary current path and said common junction for controlling charging of said capacitor in response to each sine wave positive half-cycle of source voltage to a ramp voltage having a cosine characteristic which is superimposed on said pedestal voltage to afford a large change in firing angle in response to a relatively small change in pedestal voltage.

2. The invention defined in claim 1, wherein said adjustable reference voltage means comprises:
   a unidirectional conducting device poled to block current flow into said adjustable reference voltage means on each negative half-cycle of the source voltage thereby to prevent any negative current from flowing in shunt of said responsive portion of the load.

3. The invention defined in claim 1, wherein said adjustable reference voltage means comprises:
   phase shifting means for providing said reference voltage with a leading phase angle relative to each positive half-cycle of the source voltage whereby to afford rapid charging of said firing control capacitor to the full value of said pedestal voltage very early at the beginning of each positive half-cycle of source voltage.

4. The invention defined in claim 1, wherein said adjustable reference voltage means comprises:
   a capacitor and a potentiometer connected in series and the adjustable tap of said potentiometer being connected to said unidirectional conducting element, the combination of said capacitor and said potentiometer providing the reference voltage at said movable tap with a leading phase angle relative to each positive half-cycle of source voltage to assure the attainment of a proportionately constant peak voltage early in said positive half-cycle.

5. The invention defined in claim 4, wherein said adjustable reference voltage means also comprises:
   a trimming resistor connected across said potentiometer having a selected resistance value that compensates for variations in component values in the circuit from nominal values.

6. The invention defined in claim 1, together with:
   a unidirectional conducting discharge circuit of predetermined impedance connected in parallel with said ramp voltage control means affording discharging of said firing control capacitor uniformly to the same voltage level during each nonconduction period of the semiconductor means so that the firing control capacitor always recharges through said unidirectional conducting element to the resultant pedestal voltage thereby to insure accurate control of firing of the semiconductor means on each cycle of positive source voltage through a substantial range of conduction angles.

7. A motor control and speed regulating system comprising:
   an electric motor adapted to be supplied from an alternating current source and having series-connected armature and field windings;
   a solid state controlled rectifier having an anode-cathode circuit and a gate-cathode circuit;
   reference voltage control means including selectively adjustable means for deriving a variable reference voltage;
   a first circuit comprising means connecting said anode-cathode circuit and said armature winding and said field winding in series;
   a second circuit comprising means connecting said reference voltage control means and said field winding in series;
   means for connecting said first circuit and said second circuit in parallel across the alternating current source;
   firing voltage control means connected across said gate-cathode circuit;
   ramp voltage control means connected between the anode and gate of said controlled rectifier so that said ramp voltage control means and said firing voltage control means are connected in series across said anode-cathode circuit with their junction connected to the gate of said controlled rectifier;
   unidirectional conducting means coupling said selectively adjustable means to said junction for applying reference voltage to said firing voltage control means on positive anode voltage half-cycles;
   a speed signal feedback circuit including said armature winding, an adjustable portion of said reference voltage control means, said unidirectional conducting means and said firing voltage control means wherein a feedback voltage proportional to motor speed is compared with the reference voltage to afford a resultant voltage that is applied to said firing voltage control means to develop a pedestal voltage that regulates the firing voltage in a direction compensating for variations in motor speed due to changes in motor load;

and said ramp voltage being superimposed on said pedestal voltage to control the firing angle of said controlled rectifier in response to changes in magnitude of said pedestal voltage.

8. The invention defined in claim 7, together with: switch means for shunting said solid state controlled rectifier to connect said motor directly across the source for full speed operation;

and said reference voltage control means comprising unidirectional conducting means poled to block current flow on negative voltage half-cycles therethrough in shunt of the motor armature winding.

9. The invention defined in claim 7, wherein said reference voltage control means comprises:

a high impedance adjustable voltage divider circuit.

10. The invention defined in claim 9, wherein said high impedance adjustable voltage divider circuit comprises:

a phase shifting capacitor and a potentiometer connected in series to provide a leading reference voltage.

11. The invention defined in claim 7, wherein said ramp voltage control means comprises:

a resistor having a value determinative of the gain of the system, that is, the slope of the ramp voltage.

12. The invention defined in claim 7, together with:

a diode-resistor circuit connected between the gate and anode of said controlled rectifier, said diode being poled to block current in response to a positive anode voltage on the controlled rectifier and to pass current in the opposite direction in response to the voltage on the firing voltage control means on nonconduction periods of the controlled rectifier.

13. In a series-motor operated portable tool connectable to an alternating current power source and having a hand grip including an opening therein for an operating trigger; a speed control unit having automatic feedback speed regulation comprising:

an insulating base having an open top cavity therein;

components of a motor speed control system mounted within said cavity;

an insulating mounting plate at the top of said cavity and having electrical connectors on the lower surface thereof connecting said motor speed control components in circuit and to a plurality of electrical conductors extending through holes in the base, which conductors are adapted for connecting said system to the power source and the tool motor;

an operating trigger and a frame clamping said trigger for sliding movement over said mounting plate;

potentiometer means mounted on the upper surface of said mounting plate;

switch means mounted on the upper surface of said mounting plate;

means extending through said mounting plate for connecting said potentiometer means and said switch means to said connectors therebelow;

a pair of contacts movable by said trigger for operating said potentiometer means and said switch means to said connectors therebelow;

a pair of contacts movable by said trigger for operating said potentiometer means and said switch means, respectively, to effect operation and speed adjustment of the motor when said trigger is depressed;

and said components of said motor speed control system that are housed within said base comprising:

a semiconductor controlled rectifier having an anode-cathode circuit forming a power circuit therein and a gate-cathode circuit forming a firing control circuit therein;

a reference voltage circuit that includes said potentiometer means;

means including two of said conductors that extend through holes in the base for connecting said switch means, said controlled rectifier and the armature and field windings of the motor in series circuit across the power source;

means including a third one of said conductors for connecting said reference voltage circuit in parallel with the portion of said series circuit that includes said controlled rectifier and the armature winding of the motor;

firing control means including resistance means and a firing control capacitor connected in series in that order across said anode-cathode circuit with the common junction therebetween being connected to the gate of the controlled rectifier for operation in response to each positive half-cycle of source voltage applied to the anode to develop a ramp voltage;

unidirectional conducting means connecting the movable contact of said potentiometer means to said common junction for applying an adjustable reference voltage to said capacitor upon which said ramp voltage is superimposed;

and a feedback loop circuit including a portion of said potentiometer means and the movable contact thereof, said unidirectional conducting means and said capacitor connected across the motor armature winding wherein the motor counter voltage that is proportional to motor speed is subtracted from the reference voltage for speed regulation purposes.

14. The invention defined in claim 13, wherein said reference voltage circuit comprises:

a capacitor connected in series with said potentiometer means externally of said feedback loop circuit for providing the reference voltage in said feedback loop circuit with a leading phase angle relative to the source voltage.

15. The invention defined in claim 13, together with:

a low resistance discharge path effective on negative half-cycles of source voltage for discharging said firing control capacitor into said source.

16. In a power control and feedback regulating system providing continuous control of electrical power supplied from an alternating current source to a load device starting from zero power and continuing over a substantial range of power values, the combination comprising:

a controllable semiconductor device for controlling a load circuit and comprising a pair of main current conduction electrodes and a control electrode;

means for supplying said controllable semiconductor device from the alternating current source;

a variable time delay means energized from the source for providing a firing signal to the control electrode for rendering said semiconductor device conducting in its main electrodes path at controlled times when half-cycles of source voltage are being applied to the main electrodes path comprising;

a firing control capacitor connected between said control electrode and one of the main electrodes;

adjustable reference voltage means for controlling the conduction angle of said semiconductor means;

means comprising a unidirectional conducting element coupling said adjustable reference voltage means to the control electrode side of said firing control capacitor;

a feedback loop circuit including said adjustable reference voltage means, said unidirectional conducting element, said firing control capacitor and a responsive portion of the load device wherein the latter provides a voltage proportional to the load device operation and is poled with respect to said reference voltage to afford, in a compensating manner, a resultant voltage for charging said firing control capacitor to a pedestal voltage level early on each said half-cycle of source voltage when said semiconductor device is to be rendered conducting;

and ramp voltage control means supplied from said source for controlling charging of said capacitor in response to each said half-cycle of source voltage when said semiconductor device is to be rendered conducting to a ramp voltage which is superimposed on said pedestal voltage to afford a large change in firing angle in response to a relatively small change in pedestal voltage.

17. The invention defined in claim 16, wherein:
said ramp voltage control means is adjustable to allow selective variation in the gain thereof.

18. In a power control and regulating system providing continuous control of electrical power supplied from an alternating current source to a load device starting from zero power and continuing over a substantial range of power values, the combination comprising:
a current control means having a primary current path and a control electrode;
means for connecting said primary current path in circuit with the load device across the source;
a variable time delay means providing a signal to the control electrode for rendering the primary current path of said current control means conductive for a portion of each alternation of the source voltage, comprising:
a control capacitor connected to said control electrode so as to provide storage and timed response to currents applied there to;
an adjustable reference voltage means;
a voltage source responsive to said load device operation;
coupling means for joining said control capacitor, adjustable reference voltage means and voltage source in a feedback loop circuit wherein said voltage source is poled with respect to said reference voltage to afford, in a compensating manner, a resultant voltage for charging said control capacitor to a pedestal voltage level during the off periods of said current control means;
and a ramp voltage control means for adding charge to said control capacitor in synchronism with the source voltage alternations, wherein said ramp voltage is superimposed on said pedestal voltage to afford a large change in said conducting portions of subsequent alternations of the source voltage in response to a relatively small change in pedestal voltage.

19. The invention defined in claim 18, wherein said voltage source responsive to the load device operation is a portion of said load device.

20. The invention defined in claim 18, wherein said ramp voltage control means is adjustable to allow selective variation in the gain thereof.

PO-1050
(5/69)

UNITED STATES PATENT OFFICE
CERTIFICATE OF CORRECTION

Patent No. 3,585,476          Dated June 15, 1971

Inventor(s) Walter L. Rutchik

It is certified that error appears in the above-identified patent and that said Letters Patent are hereby corrected as shown below:

```
Column 3, line 40, "pedestal" should be changed to --consists--.
Column 6, line 53, "D-R4" should read --D3-R4--.
Column 7, line 23, "R'1" should read --R1'--.
Column 8, line 29, "R'1" should read --R1'--.
Column 8, line 61, after "circuit" insert the following sentence:
-- .Since the referencedvoltage circuit is a capacitive circuit,--.
Column 10, line 35, "5bby" should read --5b by--.
Column 10, line 72, change "825 r.p.m." to --to apply--.
```

Signed and sealed this 16th day of November 1971.

(SEAL)
Attest:

EDWARD M. FLETCHER, JR.
Attesting Officer

ROBERT GOTTSCHALK
Acting Commissioner of Patents